(No Model.) 2 Sheets—Sheet 1.
M. MAYER.
DYNAMO ELECTRIC MACHINE OR MOTOR.
No. 437,160. Patented Sept. 23, 1890.
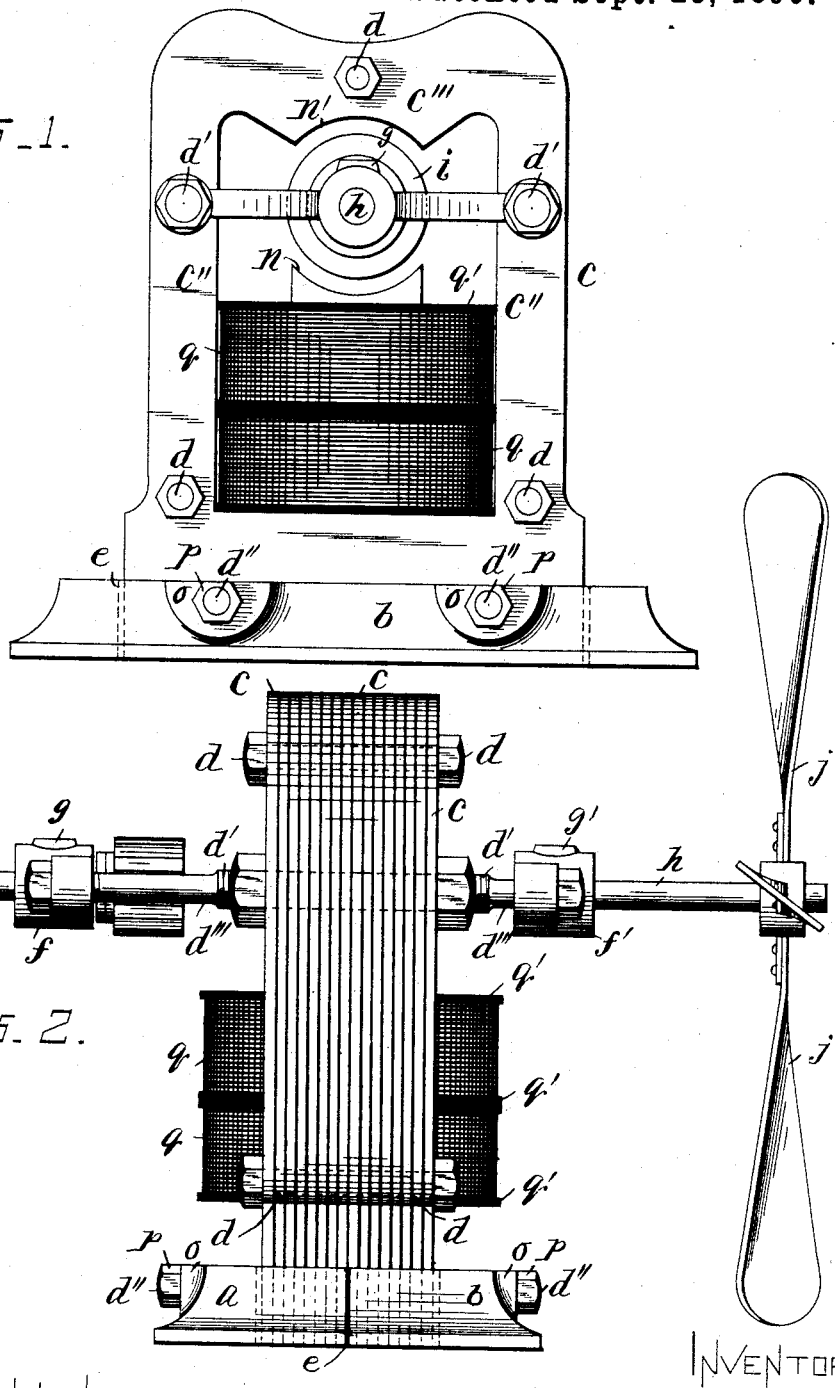
WITNESSES
Will. A. Courtland.
Nellie L. Pope.
INVENTOR
Max Mayer
BY HIS ATTORNEY
Edward P. Thompson (No Model.)  2 Sheets—Sheet 2.

M. MAYER.
DYNAMO ELECTRIC MACHINE OR MOTOR.

No. 437,160.  Patented Sept. 23, 1890.

WITNESSES
Will A. Courtland
Nellie L. Pope

INVENTOR
Max Mayer
BY HIS ATTORNEY
Edward P. Thompson

UNITED STATES PATENT OFFICE.

MAX MAYER, OF NEW YORK, N. Y., ASSIGNOR TO DAVID HIRSCH, OF SAME PLACE.

DYNAMO-ELECTRIC MACHINE OR MOTOR.

SPECIFICATION forming part of Letters Patent No. 437,160, dated September 23, 1890.

Application filed June 12, 1890. Serial No. 355,152. (No model.)

*To all whom it may concern:*

Be it known that I, MAX MAYER, a citizen of the United States, and a resident of New York, county and State of New York, have invented certain new and useful Improvements in Dynamos or Motors, of which the following is a specification.

My invention relates to an electric motor or dynamo, and especially to the details of mechanical construction of a small type of motor.

The object of the invention is principally cheapness of manufacture, and, secondly, light weight as compared to size.

The invention in all its details is set forth in the accompanying drawings, in which—

Figure 3:
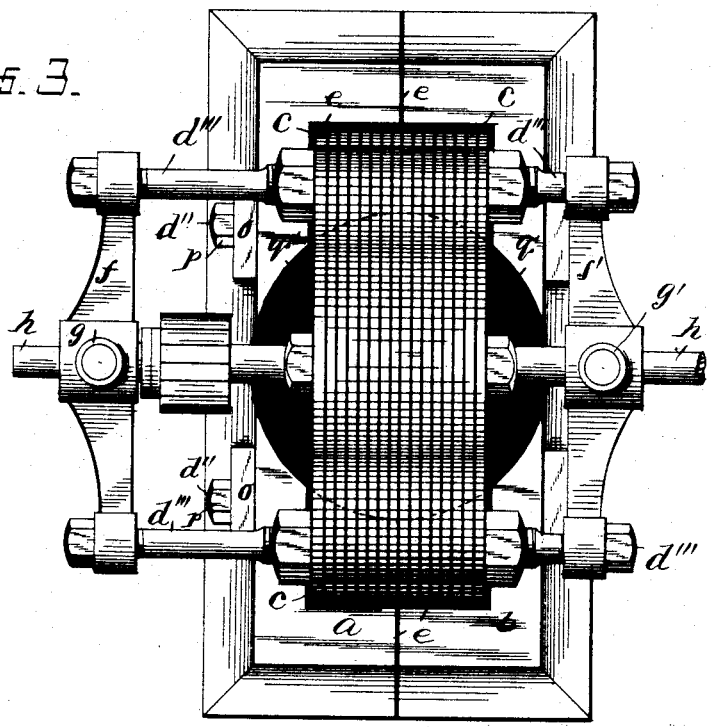
Figure 4:
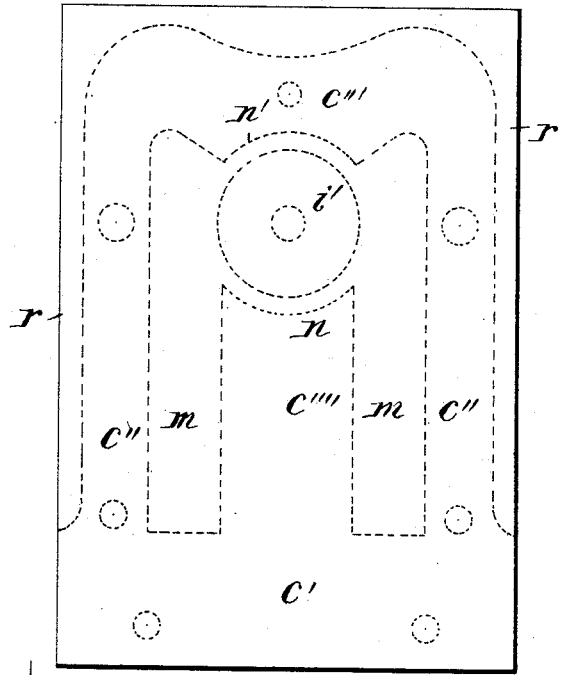

Figure 1 is a front elevation of the complete machine, except that the armature-coils are omitted. Fig. 2 is a side elevation showing the motor equipped with a ventilating blower or fan. Fig. 3 is a plan view of the machine, the fan with a portion of its shaft being removed. In Figs. 2 and 3 the commutator-brushes are omitted. Fig. 4 is a view of a plate or sheet of iron. The dotted lines indicate the outline of the cutting-edge of the stamping-machine, whereby with one stamping process the laminated disks of the armature and laminated plates of the field-magnet are produced one at a time.

The machine consists of the combination of a base-plate constructed in two parts $a$ and $b$, which when placed together form a rectangular frame, laminated field-magnet plates $c$, clamped together by bolts $d$, $d'$, and $d''$, the bolts $d''$ passing through the said frame and the lower ends of the said laminated plates in such a direction as to clamp together rigidly the base-plates $a$ and $b$ and the laminated plates $c$, thin layers of insulation $e$ between the parts $a$ and $b$ and the laminated plates $c$, extensions $d'''$ to the bolts $d'$, which pass through the laminated plates in that horizontal plane which includes the axis of the armature, cross-bars $f$ and $f''$, connecting opposite ends of the extensions $d'''$ and provided with bearings $g$ and $g'$, which surround and carry the armature-shaft $h$, an armature $i$, mounted upon said shaft and consisting of laminated plates $i'$, and a suitable fan $j$, mounted upon the shaft $h$. Each plate of the field-magnet consists of a lower rectangular portion $c'$, (see Fig. 4,) uprights $c''$ upon each end of said rectangular portion, a curved piece $c'''$, connecting the upper ends of said uprights, and a central projection $c''''$, projecting upward and parallel to the uprights $c''$, leaving spaces $m$ between itself and said uprights. The upper end of the projection $c''''$ is curved downward, while the middle portion of the cross-piece $c'''$ is curved upward. These curves are indicated, respectively, by $n$ and $n'$, and between them is located the armature-disk $i'$. In the center of each disk of the armature is a hole for the passage of the armature-shaft. Holes are also provided in the field-magnet plates for the bolts $d$ $d'$ $d''$. In both cases suitable insulation is provided between the laminæ. Projections $o$ are provided upon the sides of the base-plates $a$ and $b$, and are provided with vertical surfaces, against which press nuts $p$ upon the bolts $d''$. Upon the central extension $c''''$ are mounted two coils or magnets $q$. The length of each coil is less than the distance between the cross-piece $c'''$ and the uprights $c''$, so that the spools $q'$, upon which the coils are wound, may be placed and removed by lifting them upward and out of the space mentioned. The spools may be wound before they are placed in the machine. The metal immediately around the curves $n$ and $n'$ form the respective poles of the dynamo or motor. The armature-shaft $h$, being on the upper part of the motor, leaves plenty of room for the rotation of the fan $j$ without touching a table upon which the motor rests.

By having a cutting-edge whose outlines coincide with the dotted lines in Fig. 4 an armature-disk and field-magnet plate may be simultaneously stamped from the same sheet of metal $r$.

I claim as my invention—

A dynamo or electric motor consisting of base-plate in two parts $a$ and $b$, which when placed together form a rectangular frame, laminated iron plates whose lower ends are located in said frame and bolted thereto and to each other, each plate consisting of uprights $c''$, connected at their upper ends by cross-pieces $c'''$, and provided with central projections $c''''$ magnets $q$, located on said projections, the length of each magnet being less than the distance between the cross-pieces $c'''$ and the projections $c''''$, extensions $d'''$ of bolts $d'$, which pass through the field-magnet plates $c$, and cross-bars $f$ and $f'$, connecting said extensions and carrying an armature-shaft, of which the armature is located between the projections $c''''$ and cross-pieces $c'''$.

In testimony that I claim the foregoing as my invention I have signed my name, in presence of two witnesses, this 9th day of June, 1890.

MAX MAYER.

Witnesses:
  EDWARD P. THOMPSON,
  E. G. DUVALL, Jr.